(12) United States Patent
Lamba

(10) Patent No.: US 9,065,013 B2
(45) Date of Patent: Jun. 23, 2015

(54) SYSTEM AND METHOD FOR ENERGY RECOVERY

(71) Applicant: Electro-Motive Diesel, Inc., LaGrange, IL (US)

(72) Inventor: Harinder S. Lamba, Downers Grove, IL (US)

(73) Assignee: Electro-Motive Diesel, Inc., LaGrange, IL (US)

( * ) Notice: Subject to any disclaimer, the term of this patent is extended or adjusted under 35 U.S.C. 154(b) by 0 days.

(21) Appl. No.: 14/051,198

(22) Filed: Oct. 10, 2013

(65) Prior Publication Data

US 2015/0101647 A1  Apr. 16, 2015

(51) Int. Cl.
  *H01L 35/30* (2006.01)
  *F01N 5/02* (2006.01)
  *B60W 10/26* (2006.01)

(52) U.S. Cl.
  CPC .............. *H01L 35/30* (2013.01); *F01N 5/025* (2013.01); *B60W 10/26* (2013.01)

(58) Field of Classification Search
  CPC .............................. B60W 10/26; F01N 5/025
  USPC ................. 136/205; 180/65.1, 65.31
  See application file for complete search history.

(56) References Cited

U.S. PATENT DOCUMENTS

| 6,948,315 B2 | 9/2005 | Kirby et al. |
| 7,649,138 B2 | 1/2010 | Hiller et al. |
| 2005/0268955 A1 | 12/2005 | Meyerkord et al. |
| 2006/0000651 A1 | 1/2006 | Stabler |
| 2006/0179820 A1* | 8/2006 | Sullivan ..................... 60/275 |
| 2007/0193617 A1* | 8/2007 | Taguchi ..................... 136/204 |
| 2011/0000516 A1 | 1/2011 | Hershberger et al. |
| 2011/0272230 A1* | 11/2011 | Sekiya et al. ............ 188/70 R |
| 2012/0140882 A1* | 6/2012 | Iwakiri ..................... 378/62 |

FOREIGN PATENT DOCUMENTS

WO  2011033521  3/2011

* cited by examiner

*Primary Examiner* — Mark Hellner
(74) *Attorney, Agent, or Firm* — Miller, Matthias & Hull LLP

(57) ABSTRACT

The present disclosure relates to an energy recovery system for a vehicle. The vehicle includes a plurality of heat sources generating waste heat. The energy recovery system includes at least one thermoelectric module interfaced with each of the plurality of heat sources. Further, the waste heat provides a high temperature heat source for each of the thermoelectric modules. A low temperature heat source is interfaced with each of the thermoelectric modules. A temperature difference between the high temperature heat source and low temperature heat source produces a thermoelectric power. A controller is configured to monitor the thermoelectric power generated by each of the thermoelectric modules. The controller is further configured to optimize a utilization of the thermoelectric power generated by each of the thermoelectric modules.

20 Claims, 5 Drawing Sheets

SYSTEM AND METHOD FOR ENERGY RECOVERY

TECHNICAL FIELD

The present disclosure relates to a system and a method for energy recovery, and more specifically to a system and a method for generating electric power from waste heat available in a vehicle.

BACKGROUND

Vehicles powered by an engine are well known in the art. In some cases, the engine may be coupled with an electric generator. The electric generator may provide power to various electrical equipment of the vehicle. The engine may also provide power directly to one or more components of the vehicle.

The engine is provided with an intake air for combustion with a fuel. The engine generates an exhaust as a byproduct of combustion. In some engines, the exhaust may provide power to one or more turbochargers in order to compress the intake air in one or more stages before supplying the intake air to the engine. Due to compression, an intercooler and an aftercooler may be provided to cool the intake air after each stage of compression.

The exhaust may be discharged after passing through the one or more turbochargers. Consequently, a heat associated with the exhaust may be wasted. Further, heat extracted from the intake air in the intercooler and the aftercooler may also be wasted. Heat may also be lost through various other components of the vehicles, for example, but not limited to, a dynamic brake grid, a radiator etc. Therefore, an efficiency of the vehicles may get reduced.

U.S. Published Application Number 2005268955 discloses a locomotive diesel engine waste heat recovery system for converting waste heat of engine combustion into useful work. A thermoelectric module is connected to the hot engine exhaust to provide a high temperature heat source, and the engine coolant system is also connected to the thermoelectric module to provide a low temperature heat source. The difference in temperature of the heat sources powers the thermoelectric module to convert waste heat of the engine into electricity to power selected devices of the locomotive.

SUMMARY OF THE DISCLOSURE

In one embodiment of the present disclosure, an energy recovery system for a vehicle is provided. The vehicle includes a plurality of heat sources generating waste heat. The energy recovery system includes at least one thermoelectric module interfaced with each of the plurality of heat sources. Further, the waste heat provides a high temperature heat source for each of the thermoelectric modules. A low temperature heat source is interfaced with each of the thermoelectric modules. A temperature difference between the high temperature heat source and low temperature heat source produces a thermoelectric power. A controller is configured to monitor the thermoelectric power generated by each of the thermoelectric modules. The controller is further configured to optimize a utilization of the thermoelectric power generated by each of the thermoelectric modules.

Other features and aspects of this disclosure will be apparent from the following description and the accompanying drawings.

DETAILED DESCRIPTION

Figure 1:
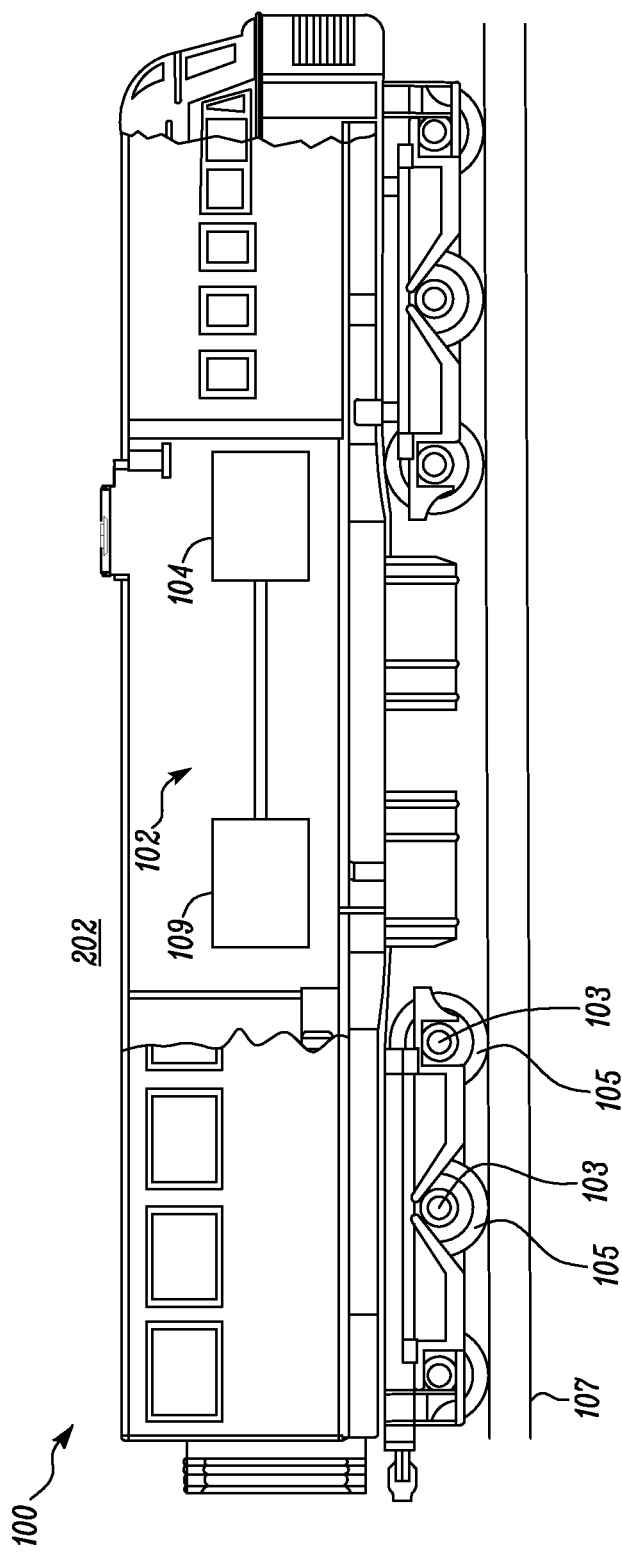
FIG. 1 is a side view of an exemplary vehicle, according to an embodiment of the present disclosure.

Wherever possible, the same reference numbers will be used throughout the drawings to refer to the same or the like parts. Referring to FIG. 1, an exemplary vehicle 100 is illustrated. Specifically, the vehicle 100 is a locomotive. Alternately, the vehicle 100 may be an electric multiple unit, a trolleybus, a tram, or the like.

The vehicle 100 includes a power source 102 (shown schematically). In an embodiment, the power source 102 may include an engine 104 coupled to an electric generator 109. The engine 104 may also provide power to other components of the vehicle 100. The engine 104 may be an internal combustion engine or a gas turbine. In a specific embodiment, the engine 104 may be a diesel engine. The electric generator 109 may provide power to various electric equipment of the vehicle 100 including a vehicle drive system (shown schematically in later figures) and an auxiliary system (shown schematically in later figures) of the vehicle 100. The vehicle drive system may include multiple traction motors configured to drive respective axles 103. The axles 103 are coupled to a pair of wheels 105 which run on rails 107.

The engine 104 combusts fuel and produces power for running the vehicle 100. In the process, the engine 104 also produces a waste heat. An energy recovery system (explained hereinafter with reference to later figures) may be provided to recover at least a portion of the waste heat produced by the engine 104. A residual waste heat may be rejected to atmosphere 202.

Figure 2:
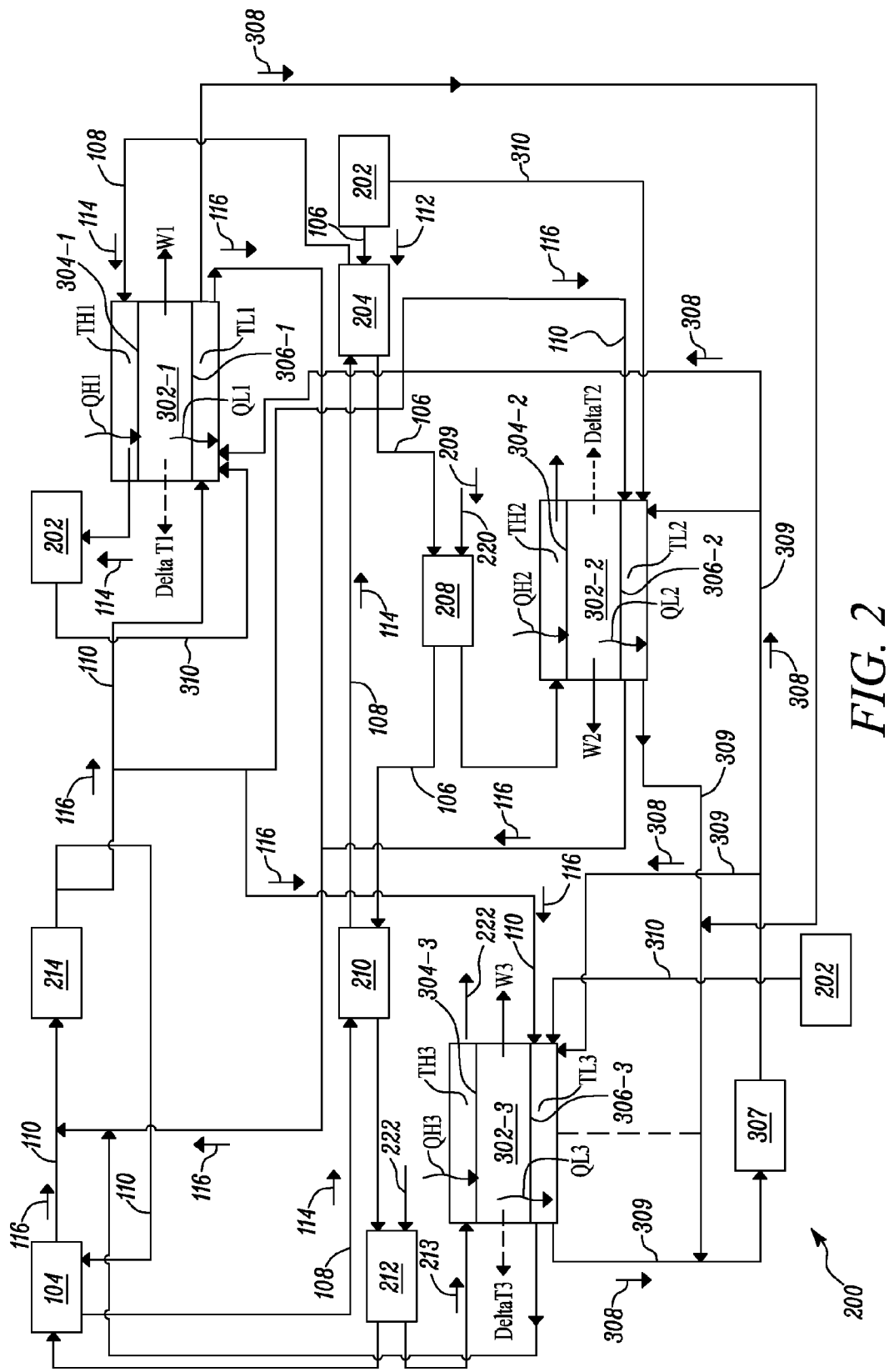
FIG. 2 is a schematic illustration of an energy recovery system of the vehicle, according to an embodiment of the present disclosure.

FIG. 2 illustrates a schematic view of the energy recovery system 200, according to an embodiment of the present disclosure. As illustrated in FIG. 2, an intake conduit 106, an exhaust conduit 108 and a coolant conduit 110 are associated with the engine 104. Intake air 112 flows through the intake conduit 106. The intake air 112 is mixed with fuel and combusted in order to generate power. Further, the engine 104 generates an engine exhaust 114 (hereinafter referred to as "the exhaust 114") as a byproduct of combustion. The exhaust 114 flows through the exhaust conduit 108. A coolant 116 flowing through the coolant conduit 110 is configured to cool the engine 104. It may be apparent that the intake, exhaust and coolant conduits 106, 108, 110 are shown schematically in FIG. 2. The intake, exhaust and coolant conduits 106, 108, 110 may include multiple sections with different shapes and dimensions. Further, various details of associated components (E.g., valves, filters) have been omitted for clarity.

The intake air 112 may be inducted from atmosphere 202. The intake air 112 may pass through a filter (not shown). The intake air 112 then flows into a first stage turbocharger 204. Further, the exhaust 114 flows from the engine 104 into the first stage turbocharger 204. The first stage turbocharger 204 may include a turbine (not shown) driven by the exhaust 114. The first stage turbocharger 204 may further include a compressor (not shown) coupled to and powered by the turbine.

Thus, the first stage turbocharger 204 may extract energy from the exhaust 114 in order to increase a pressure of the intake air 112. The intake air 112 then enters an aftercooler 208. The aftercooler 208 may extract heat from the intake air 112. In various embodiments, the aftercooler 208 may use a first cooling fluid 209, such as air, a liquid (E.g., water), or the like to extract heat from the intake air 112. The first cooling fluid 209 flows through a first conduit 220.

As shown in FIG. 2, the intake air 112 then enters a second stage turbocharger 210 from the aftercooler 208. The exhaust 114 also flows into the second stage turbocharger 210. The second stage turbocharger 210 may extract more energy from the exhaust 114 in order to further increase a pressure of the intake air 112. The intake air 112 then flows into an intercooler 212. The intercooler 212 may extract heat from the intake air 112. In various embodiments, the intercooler 212 may use a second cooling fluid 213 such as, air, liquid (E.g., water), or the like to extract heat from the intake air 112. The second cooling fluid 213 flows through a second conduit 222. In an embodiment, the first and second cooling fluids 209, 213 used by the aftercooler 208 and the intercooler 212, respectively, may be similar. In a further embodiment, the first and second cooling fluids 209, 213 may be the coolant 116 routed from a cooling system 214 (described in detail hereinafter) associated with the engine 104. After getting cooled in the intercooler 212, the intake air 112 enters the engine 104 and takes part in combustion.

As shown in FIG. 2, the coolant 116 may flow through various passages (not shown) of the engine 104 to extract heat from the engine 104. The coolant 116 then flows to the cooling system 214. In an embodiment, the cooling system 214 may be a radiator. In various other embodiments, the cooling system 214 may be a refrigeration type cooling unit. The cooling system 214 may also be associated with other components of the vehicle 100 in addition to the engine 104. The cooling system 214 may include a fan (not shown) which may blow air over conduits (not shown) in the cooling system 214 through which the coolant 116 flows. The cooling system 214 may therefore extract heat from the coolant 116. The coolant 116 then flows back to the engine 104. The cooling system 214 may also include a pump (not shown) to circulate the coolant 116 to and from the engine 104. A portion of the coolant 116 may be selectively diverted from the cooling system 214 after extraction of heat. The diverted portion of the coolant 116 may flow back into the cooling system 214.

As shown in FIG. 2, the exhaust 114 is interfaced with a first thermoelectric module 302-1 after the second stage turbocharger 210. The first thermoelectric module 302-1 may be located adjacent to or integral with the second stage turbocharger 210. The exhaust 114 may contact a high temperature side 304-1 of the first thermoelectric module 302-1. The exhaust 114 therefore provides a high temperature heat source TH1 for the first thermoelectric module 302-1. The exhaust 114 may provide a heat QH1 to the high temperature side 304-1 of the first thermoelectric module 302-1. Further, the coolant 116 diverted from the cooling system 214 may be selectively interfaced with a low temperature side 306-1 of the first thermoelectric module 302-1. In an embodiment, a secondary cooling system 307 may be associated with the first thermoelectric module 302-1. In various embodiments, the secondary cooling system 307 may be a vapor compression cycle based system, a radiator based system, or the like. In a further embodiment, the secondary cooling system 307 may be driven by an exhaust gas re-circulator (not shown). The recirculated exhaust (not shown) may then get cooled and routed back to the engine 104 for combustion. A secondary coolant 308 of the secondary cooling system 307 may be selectively interfaced with the low temperature side 306-1 of the first thermoelectric module 302-1. The secondary coolant 308 may flow through secondary coolant conduits 309. In a further embodiment, ambient air 310 from atmosphere 202 may also be selectively interfaced with the low temperature side 306-1 of the first thermoelectric module 302-1. One or more fans (not shown) and vanes (not shown) may control a flow of ambient air 310. In an embodiment, various combinations of the cooling system 214, the secondary cooling system 307, and/or ambient air 310 may act as a low temperature heat source TL1 for the first thermoelectric module 302-1. The low temperature heat source TL1 may extract a heat QL1 from the low temperature side 306-1 of the first thermoelectric module 302-1. The first thermoelectric module 302-1 may provide a work output W1 in the form of electrical power due to a temperature difference DeltaT1 between the high and low temperature heat sources TH1, TL1. The temperature difference DeltaT1 enables exchange of the heats QH1 and QL1 in the directions shown in FIG. 2. The work output W1 is the thermoelectric power generated by the first thermoelectric module 302-1.

Further, as shown in FIG. 2, the first cooling fluid 209 is interfaced with a second thermoelectric module 302-2 after the aftercooler 208. The second thermoelectric module 302-2 may be located adjacent to or integral with the aftercooler 208. The first cooling fluid 209 may contact a high temperature side 304-2 of the second thermoelectric module 302-2. The first cooling fluid 209 therefore provides a high temperature heat source TH2 for the second thermoelectric module 302-2. The heat extracted from the intake air 112 in the aftercooler 208 may be at least partly provided by the first cooling fluid 209 to the high temperature side 304-2. As shown in FIG. 2, the first cooling fluid 209 may provide a heat QH2 to the high temperature side 304-2 of the second thermoelectric module 302-2. Further, the coolant 116 diverted from the cooling system 214 may be selectively interfaced with a low temperature side 306-2 of the second thermoelectric module 302-2. In an embodiment, the secondary cooling system 307 may also be associated with the second thermoelectric module 302-2. Specifically, the secondary coolant 308 of the secondary cooling system 307 may be selectively interfaced with the low temperature side 306-2 of the second thermoelectric module 302-2. In a further embodiment, ambient air 310 from atmosphere 202 may also be selectively interfaced with the low temperature side 306-2 of the second thermoelectric module 302-2. In an embodiment, various combinations of the cooling system 214, the secondary cooling system 307, and/or ambient air 310 may act as a low temperature heat source TL2 for the second thermoelectric module 302-2. The low temperature heat source TL2 may extract a heat QL2 from the low temperature side 306-2 of the second thermoelectric module 302-2. The second thermoelectric module 302-2 may provide a work output W2 in the form of electrical power due to a temperature difference DeltaT2 between the high and low temperature heat sources TH2, TL2. The temperature difference DeltaT2 enables exchange of the heats QH2 and QL2 in the directions shown in FIG. 2. The work output W2 is the thermoelectric power generated by the second thermoelectric module 302-2.

Further, the second cooling fluid 213 is interfaced with a third thermoelectric module 302-3 after the intercooler 212. The third thermoelectric module 302-3 may be located adjacent to or integral with the intercooler 212. The second cooling fluid 213 may contact a high temperature side 304-3 of the third thermoelectric module 302-3. The second cooling fluid 213 therefore provides a high temperature heat source TH3 for the third thermoelectric module 302-3. The heat extracted from the intake air 112 in the intercooler 212 may be at least partly provided by the second cooling fluid 213 to the high temperature side 304-3. As shown in FIG. 2, the second cooling fluid 213 may provide a heat QH3 to the high temperature side 304-3 of the third thermoelectric module 302-3. Further, the coolant 116 diverted from the cooling system 214 may be selectively interfaced with a low temperature side 306-3 of the third thermoelectric module 302-3. In an embodiment, the secondary cooling system 307 may also be associated with the third thermoelectric module 302-3. Specifically, the secondary coolant 308 of the secondary cooling system 307 may be selectively interfaced with the low temperature side 306-3 of the third thermoelectric module 302-3. In a further embodiment, ambient air 310 from atmosphere 202 may also be selectively interfaced with the low temperature side 306-3 of the third thermoelectric module 302-3. In an embodiment, various combinations of the cooling system 214, the secondary cooling system 307, and/or ambient air 310 may act as a low temperature heat source TL3 for the third thermoelectric module 302-3. The low temperature heat source TL3 may extract a heat QL3 from the low temperature side 306-3 of the third thermoelectric module 302-3. The third thermoelectric module 302-3 may provide a work output W3 in the form of electrical power due to a temperature difference DeltaT3 between the high and low temperature heat sources TH3, TL3. The temperature difference DeltaT3 enables exchange of the heats QH3 and QL3 in the directions shown in FIG. 2. The work output W3 is the thermoelectric power generated by the third thermoelectric module 302-3.

The vehicle 100 therefore includes a plurality of heat sources, namely, the exhaust 114, the aftercooler 208 and the intercooler 212 associated with the first, second and third thermoelectric modules 302-1, 302-2, 302-3, respectively. Further, the energy recovery system 200 is able to recover the heats QH1, QH2 and QH3, which otherwise would have been rejected as the waste heat to atmosphere 202, and produce the work outputs W1, W2 and W3. Each of the first, second and third thermoelectric modules 302-1, 302-2, 302-3 may include multiple thermoelectric devices arranged in a series/parallel configuration. This will be described in detail with reference to FIG. 4.

The various aspects of the energy recovery system 200, as described in FIG. 2, is purely exemplary in nature, and the energy recovery system 200 may be of any other design and/or configuration within the scope of the present disclosure. For example, in addition to the heat sources described with reference to FIG. 2, various other components of the vehicle 100 (shown in FIG. 1) may be additional heat sources, for example, but not limited to, a dynamic brake grid (not shown), a hot side of the cooling system 214, electrical cabinets (not shown) of the vehicle 100, traction motors, the generator 109 (shown in FIG. 1), air-conditioning system (not shown) etc. The additional high temperature heat sources may be interfaced with high temperature sides of respective additional thermoelectric modules (not shown). Low temperature sides of the additional thermoelectric modules may be interfaced with various combinations of the cooling system 214, the secondary cooling system 307, and/or ambient air 310 which act as low temperature heat sources. Thus, the additional thermoelectric modules may generate electrical power based on temperature differences between the respective high and low temperature heat sources.

Further, in an embodiment, a control system 400 (shown in FIG. 3) is associated with the energy recovery system 200. Various details of the control system will be described hereinafter with reference to FIG. 3.

Figure 3:
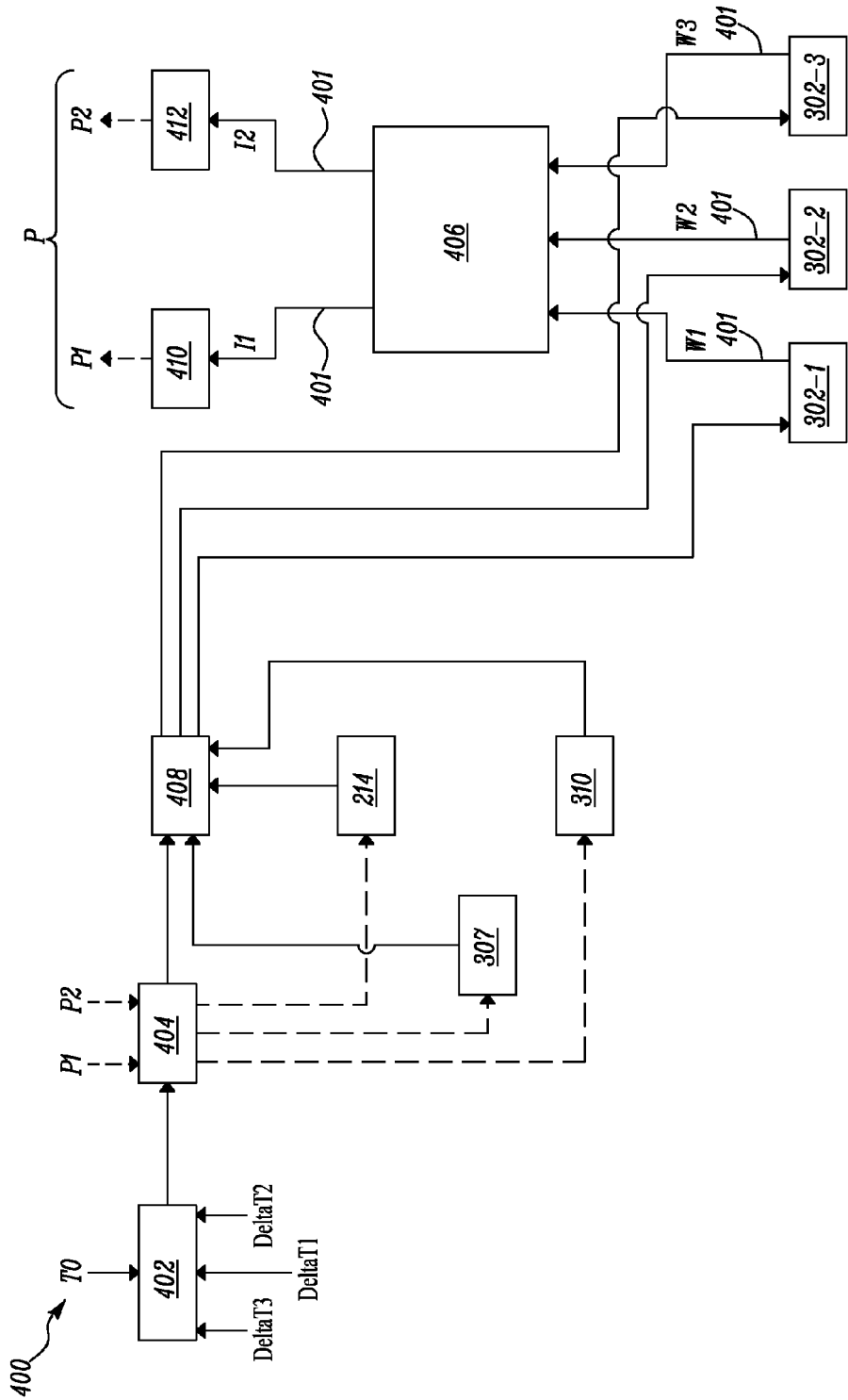
FIG. 3 is a schematic illustration of a control system of the energy recovery system, according to an embodiment of the present disclosure.

FIG. 3 illustrates the control system 400, according to an embodiment of the disclosure. Reference will also be made to FIG. 2 to describe various aspects of the control system 400. The control system 400 includes a data acquisition system 402, a first controller 404, a second controller 406 and a cooling controller 408. In an embodiment, the data acquisition system 402, the first controller 404, the second controller 406 and the cooling controller 408 may be independent units. In an alternative embodiment, the data acquisition system 402, the first controller 404, the second controller 406 and the cooling controller 408 may be sub-sections of a single controller (not shown).

The data acquisition system 402 may be configured to receive input signals indicative of the temperature differences DeltaT1, DeltaT2 and DeltaT3. The data acquisition system 402 may be connected to various temperature sensors (not shown) and include multiple signal filters (not shown), converters (not shown), or the like to process the input signals in order to obtain the values of the temperature differences DeltaT1, DeltaT2 and DeltaT3. The data acquisition system 402 also receives signals indicative of an ambient temperature T0 of atmosphere 202. The data acquisition system 402 may also be configured to receive input signals indicative of other parameters of the vehicle 100 (shown in FIG. 1), such as, but not limited to, a throttle position, modes of operation (E.g., braking or driving modes) of the traction motors, power requirement of various electric equipment of the vehicle 100 etc.

The first controller 404 may be in communication with the data acquisition system 402. Further, the first controller 404 may also be configured to provide control signals to the cooling controller 408 based on the received data from the data acquisition system 402. Specifically, the first controller 404 may provide the control signals to the cooling controller 408 based on least one of the values of the temperature differences DeltaT1, DeltaT2 and DeltaT3, the ambient temperature T0, and a power requirement P of the vehicle 100. In an embodiment, the power requirement P may be the power requirement of various electrical equipment of the vehicle 100. The electrical equipment includes a vehicle drive system 410 and an auxiliary system 412. The vehicle drive system 410 may include multiple traction motors as described with reference to FIG. 1. Power requirements of the vehicle drive system 410 and the auxiliary system 412 may be P1 and P2, respectively. The power requirement P may be a sum of the power requirements P1 and P2. The auxiliary system 412 may include lights, pumps, energy storage devices (E.g., batteries), electronic devices etc. The first controller 404 may receive input signals (shown by dotted lines) indicative of the power requirements P1 and P2.

The cooling controller 408 may be configured to regulate the cooling system 214 and the secondary cooling system 307 based on the control signals from the first controller 404. The cooling controller 408 may also regulate the vanes and fans associated with the supply of ambient air 310 based on the control signals from the first controller 404. This control is shown schematically by lines from the cooling system 214, the secondary cooling system 307 and ambient air 310 to the cooling controller 408. The lines from the cooling controller 408 to the first, second and third thermoelectric modules 302-1, 302-2, 302-3 schematically illustrate control of the low temperature heat sources TL1, TL2 and TL3 (shown in FIG. 2). Therefore, the first controller 404 indirectly controls (schematically shown by dotted lines) the various cooling sub-systems of the vehicle 100 via the cooling controller 408.

In an embodiment, the first controller 404 may be configured to select the low temperature heat sources TL1, TL2, and TL3 associated with the first, second and third thermoelectric modules 302-1, 302-2, 302-3, respectively. The first controller 404 may be further configured to control temperatures of the low temperature heat sources TL1, TL2, and TL3. Specifically, the first controller 404 may be configured to optimize the temperature differences DeltaT1, DeltaT2 and DeltaT3 by regulating the low temperature heat sources TL1, TL2 and TL3. Optimizing the temperature differences DeltaT1, DeltaT2, and DeltaT3 may lead to optimizing the work outputs W1, W2 and W3 from the first, second and third thermoelectric modules 302-1, 302-2, 302-3, respectively. The work outputs W1, W2 and W3 may be conveyed by connectors 401. The first controller 404 may employ various control strategies to achieve this based on at least one of the values of the temperature differences DeltaT1, DeltaT2, and DeltaT3, the ambient temperature T0, and the power requirements P1 and P2.

One such control strategy may include maximizing the temperature differences DeltaT1, DeltaT2, and DeltaT3 such that the work outputs W1, W2 and W3 are also maximized. For example, if the throttle position of the vehicle 100 is increased to a higher level, a temperature of the exhaust 114 also increases. The power requirement P1 also increases. Consequently, the temperature of the high temperature heat source TH1 associated with the first thermoelectric module 302-1 is also high, as the exhaust 114 provides the high temperature heat source TH1. Therefore, the work output W1 generated by the first thermoelectric module 302-1 may be increased. The first controller 404 may then provide a signal to the cooling controller 408 to decrease the temperature of the low temperature heat source TL1 associated with the first thermoelectric module 302-1. The cooling controller 408 may achieve this by increasing the flow of ambient air 310 to the first thermoelectric module 302-1 by controlling the vanes and the fans associated with the supply of ambient air 310. The cooling controller 408 may also increase the flow of the coolant 116 from the cooling system 214 to the first thermoelectric module 302-1. This may be done by regulating the pump and valves (not shown) associated with the cooling system 214. The cooling controller 408 may further increase the flow of the secondary coolant 308 of the secondary cooling system 307 to the first thermoelectric module 302-1. In case the secondary cooling system 307 is based on vapor compression refrigeration cycle, the cooling controller 408 may regulate a compressor (not shown) and/or an expansion device (not shown) of the secondary cooling system 307. In an embodiment, the cooling controller 408 may select one of ambient air 310, the cooling system 214 and the secondary cooling system 307 as the low temperature heat source TL1 associated with the first thermoelectric module 302-1. In other embodiments, the cooling controller 408 may implement various combinations of ambient air 310, the cooling system 214 and the secondary cooling system 307 as the low temperature heat source TL1. The cooling controller 408 finally decreases the temperature of the low temperature heat source TL1 in order to increase the temperature difference DeltaT1 and thereby, the work output W1 of the first thermoelectric module 302-1. In another example, the cooling controller 408 may detect a rise in the ambient temperature T0. This may decrease the temperature differences DeltaT1, DeltaT2 and DeltaT3 and hence, the work outputs W1, W2 and W3. The cooling controller 408 may then regulate the cooling system 214 and the secondary cooling system 307 to increase the temperature differences DeltaT1, DeltaT2 and DeltaT3 to prior levels. Similar strategies may be used for the low temperature heat sources TL2 and TL3 associated with the second and third thermoelectric modules 302-2 and 302-3.

In an embodiment, the second controller 406 may be configured to monitor the work outputs W1, W2 and W3 of the first, second and third thermoelectric modules 302-1, 302-2 and 302-3. Further, the second controller 406 may be also configured to monitor the power requirement P of the vehicle 100. Specifically, the second controller 406 is configured to monitor the power requirements P1 and P2 of the vehicle drive system 410 and the auxiliary system 412, respectively. The second controller 406 may be further configured to optimize a utilization of the work outputs W1, W2 and W3. As described before, the work outputs W1, W2 and W3 are the thermoelectric power generated by the first, second and third thermoelectric modules 302-1, 302-2 and 302-3.

The second controller 406 may employ various strategies to optimize the utilization of the work outputs W1, W2 and W3 based in the power requirement P of the vehicle 100. In an embodiment, the work outputs W1, W2 and W3 may be combined to obtain a combined work output. The combined work output may be divided into thermoelectric power I1 and I2 which are provided to the vehicle drive system 410 and the auxiliary system 412, respectively, based on the power requirements P1 and P2. The thermoelectric power I1 and I2 may be conveyed by connectors 401. For example, if the throttle position of the vehicle 100 is at a higher level, the power requirement P1 of the vehicle drive system 410 may be high. In such a case, the second controller 406 may combine the work outputs W1, W2 and W3, and provide a major portion of the combined work output to the vehicle drive system 410 in the form of the thermoelectric power I1. In some cases, whole of the combined work output may be provided to the vehicle drive system 410. Thus, the thermoelectric power I2 may be zero in that case. The thermoelectric power I1 may provide at least a portion of the power requirement P1 of the vehicle drive system 410. Therefore, the power required to be generated by the engine 104 may be decreased. In another example, the power requirement P1 of the vehicle drive system 410 may be low. In that case, the thermoelectric power I2 may be higher than the thermoelectric power I1. The thermoelectric power I2 may be distributed among various types of auxiliary equipment of the vehicle 100 based on their individual power requirements. In a further example, the second controller 406 may determine that the work output W1 may be approximately equal to the power requirement of any one of the auxiliary equipment (E.g., the lights) of the vehicle 100. In such case, the second controller 406 may divert the work output W1 to provide thermoelectric power to the lights of the vehicle 100. Thus, the second controller 406 may combine the work outputs W1, W2 and W3 in any manner based on the power requirement of the electrical equipment of the vehicle 100.

In an embodiment, the second controller 406 may determine if the work outputs W1, W2 and W3 are above a minimum threshold level. If one or more of the work outputs W1, W2 and W3 is below the minimum threshold level, the second controller 406 may block the corresponding thermoelectric modules 302-1, 302-2 or 302-3. The second controller 406 may block any of the first, second and third thermoelectric modules 302-1, 302-2 and 302-3 by blocking diodes (not shown) in order to prevent reversal in the direction of electricity flow. Thus, any of the first, second and third thermoelectric modules 302-1, 302-2 and 302-3 that does not generate significant thermoelectric power is blocked so that any of the first, second and third thermoelectric modules 302-1, 302-2 and 302-3 may not consume electric power. Details of each of the first, second and third thermoelectric modules 302-1, 302-2 and 302-3 will be now described hereinafter with reference to FIG. 4.

Figure 4:
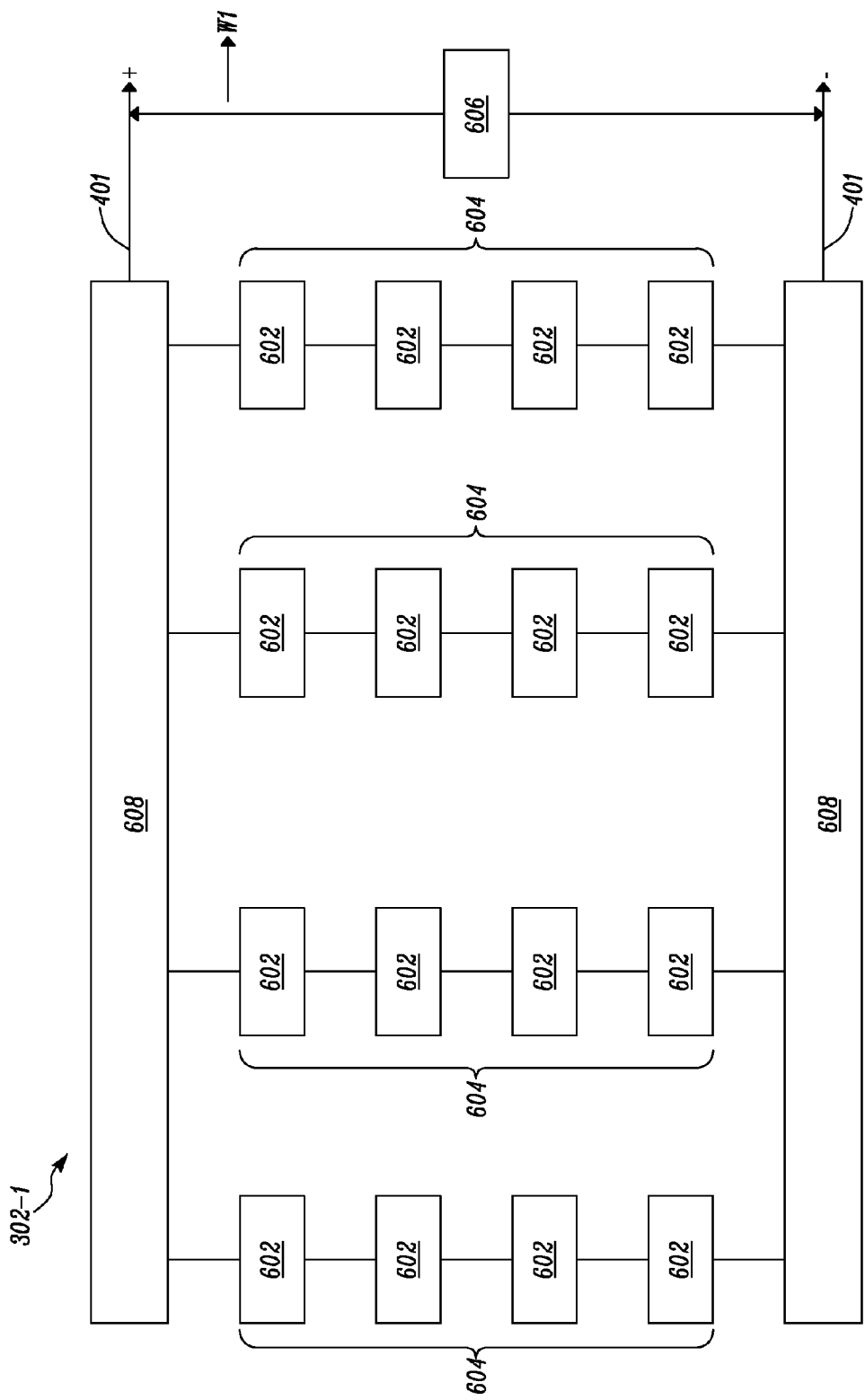
FIG. 4 is a schematic illustration of a thermoelectric module, according to an embodiment of the present disclosure.

FIG. 4 illustrates the first thermoelectric module 302-1, according to an embodiment of the present disclosure. The details of the first thermoelectric module 302-1 may be applicable to the second and third thermoelectric modules 302-2, 302-3. The first thermoelectric module 302-1 includes multiple thermoelectric devices 602. Each of the thermoelectric devices 602 may be made of a semiconductor material, a metal alloy, or the like such that each of the thermoelectric devices 602 may generate a thermoelectric power based on the temperature difference DeltaT1 between the high temperature side 304-1 (shown in FIG. 2) and the low temperature side 306-1 (shown in FIG. 2) of the first thermoelectric module 302-1. The thermoelectric power results in a DC voltage across each of the thermoelectric devices 602, thereby resulting in a current flow from a positive terminal (+) to a negative terminal (−) of each of the thermoelectric devices 602.

As shown in FIG. 4, a number of the thermoelectric devices 602 may be connected in series with a positive terminal of one thermoelectric device 602 connected to a negative terminal of the adjacent thermoelectric device 602 in order to form a series section 604. The exemplary series sections 604, as shown in FIG. 4, include four of the thermoelectric devices 602 connected in series. Further, there are four of the series sections 604. However, there may be any number of the thermoelectric devices 602 connected in series to form the series section 604, and there may be any number of the series sections 604. The series sections 604 are connected to an output 606 of the first thermoelectric module 302-1 via electric connectors 608 in a parallel configuration. The magnitude of the thermoelectric power at the output 606 may be the work output W1 of the first thermoelectric module 302-1. The electric connectors 608 are connected to a positive side (+) and a negative side (−) of the output 606 of the first thermoelectric module 302-1. Thus, a DC voltage across each of the four thermoelectric devices 602 is added to provide a voltage output of each of the series sections 604. However, the same current flows through each of the four thermoelectric devices 602 of the series section 604. The currents from each of the series sections 604 may get added in the electric connectors 608 and flow to the output 606. Thus, a voltage output of the first thermoelectric module 302-1 may be the voltage output of each of the series sections 604. Further, a current output of the first thermoelectric module 302-1 may be equal to a sum of the currents from the series sections 604. In an embodiment, a blocking diode (not shown) may be provided at one end of each of the series sections 604. The blocking diode may ensure a unidirectional flow of the current through each of the series sections 604. Therefore, any one of the series sections 604, which does not generate any thermoelectric power, may not draw current from any of the other series sections 604, and reduce the work output W1 of the thermoelectric module 302-1.

INDUSTRIAL APPLICABILITY

Current vehicles powered by an engine are provided with an intake air for combustion with a fuel. The engine generates an exhaust as a byproduct of combustion. In some engines, the exhaust may provide power to one or more turbochargers in order to compress the intake air in one or more stages before supplying the intake air to the engine. Due to compression, an intercooler and an aftercooler may be provided to cool the intake air after each stage of compression. The exhaust may be discharged after passing through the one or more turbochargers. Consequently, a heat associated with the exhaust may be wasted. Further, heat extracted from the intake air in the intercooler and the aftercooler may also be wasted. Heat may also be lost through various other components of the vehicles, for example, but not limited to, a dynamic brake grid, a radiator etc. Therefore, an efficiency of the vehicles may get reduced.

The present disclosure relates to the energy recovery system 200 for the vehicle 100. The vehicle 100 may be a locomotive, a tram, a trolleybus, an electric multiple unit, or the like. The vehicle 100 includes multiple heat sources generating waste heat, for example, but not limited to, the exhaust 114, the intercooler 212, the aftercooler 208 etc. The first, second and third thermoelectric modules 302-1, 302-2, 302-3 are interfaced with the exhaust 114, the intercooler 212 and the aftercooler 208, respectively. The waste heat from the exhaust 114, the intercooler 212, and the aftercooler 208 provide the high temperature heat sources TH1, TH2 and TL2. Further, the low temperature heat sources TL1, TL2 and TL3 are interfaced with the first, second and third thermoelectric modules 302-1, 302-2, 302-3, respectively. The temperature differences DeltaT1, DeltaT2 and DeltaT3 between the high temperature heat sources TH1, TH2 and TL2, and the low temperature heat sources TL1, TL2 and TL3 produce the work outputs W1, W2 and W3, respectively. The work outputs W1, W2 and W3 are equivalent to the thermoelectric power generated by the first, second and third thermoelectric modules 302-1, 302-2, 302-3, respectively. The first controller 404 is configured to monitor the work outputs W1, W2 and W3. Further, the first controller 404 is configured to optimize the utilization of the work outputs W1, W2 and W3.

Figure 5:
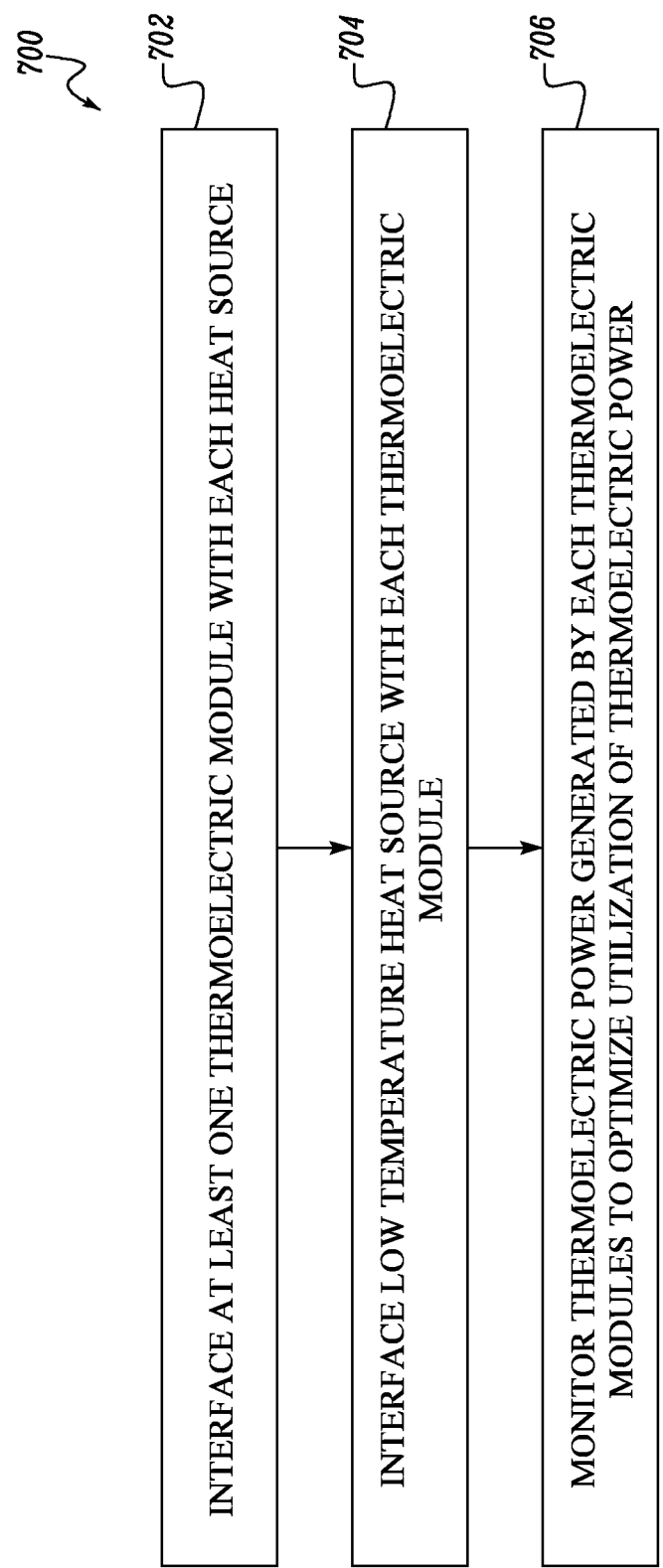
FIG. 5 illustrates a method of energy recovery heat in the vehicle, according to an embodiment of the present disclosure.

FIG. 5 illustrates a method 700 of energy recovery in the vehicle 100. At step 702, the method 700 includes interfacing at least one thermoelectric module with each of the plurality of heat sources of the vehicle 100. In an embodiment, the first, second and third thermoelectric modules 302-1, 302-2, 302-3 are interfaced with the exhaust 114, the intercooler 212 and the aftercooler 208, respectively. The waste heat from the exhaust 114, the intercooler 212, and the aftercooler 208 provide the high temperature heat sources TH1, TH2 and TL2, respectively. At step 704, the method 700 includes interfacing the low temperature heat sources TL1, TL2 and TL3 with the first, second and third thermoelectric modules 302-1, 302-2, 302-3, respectively. In an embodiment, the low temperature heat sources TL1, TL2 and TL3 may include various combinations of ambient air 310, the cooling system 214 and the secondary cooling system 307. The temperature differences DeltaT1, DeltaT2 and DeltaT3 between the high temperature heat sources TH1, TH2 and TL2, and the low temperature heat sources TL1, TL2 and TL3 produce the work outputs W1, W2 and W3, respectively. At step 706, the method 700 includes monitoring the work outputs W1, W2 and W3 to optimize the utilization of the work outputs W1, W2 and W3. The method 700 may optimize the utilization of the work outputs W1, W2 and W3 based on the power requirement P of the vehicle 100. In an embodiment, the power requirement P may be the power requirement of the electrical equipment of the vehicle 100. The electrical equipment of the vehicle 100 may include the vehicle drive system 410 and the auxiliary system 412. Therefore, the power requirement P may be the sum of the power requirements P1 and P2 of the vehicle drive system 410 and the auxiliary system 412, respectively.

The first, second and third thermoelectric modules 302-1, 302-2, 302-3 may enable at least a partial recovery of the waste heat generated by the exhaust 114, the intercooler 212, the aftercooler 208, respectively. Further, the control system 400 may enable an optimal utilization of the work outputs W1, W2 and W3 based on the power requirements P1 and P2, and the magnitudes of the work outputs W1, W2 and W3. The control system 400 may select and combine the work outputs W1, W2 and W3 in various manners to provide thermoelectric power to the electrical equipment of the vehicle 100. Thus, an efficiency of the vehicle 100 is improved.

While aspects of the present disclosure have been particularly shown and described with reference to the embodiments above, it will be understood by those skilled in the art that various additional embodiments may be contemplated by the modification of the disclosed machines, systems and methods without departing from the spirit and scope of what is disclosed. Such embodiments should be understood to fall within the scope of the present disclosure as determined based upon the claims and any equivalents thereof.

What is claimed is:

1. An energy recovery system for a vehicle having a plurality of heat sources generating waste heat, the plurality of heat sources including an engine exhaust and an aftercooler, the aftercooler using a first cooling fluid to extract heat from an intake air, the energy recovery system comprising:
   at least one thermoelectric module interfaced with each of the plurality of heat sources, wherein the waste heat provides a high temperature heat source for each of the thermoelectric modules, the at least one thermoelectric module including a first thermoelectric module and a second thermoelectric module, the engine exhaust interfaced with the first thermoelectric module, the first cooling fluid interfaced with the second thermoelectric module after the aftercooler, the first cooling fluid providing a high temperature heat source for the second thermoelectric module;
   a low temperature heat source interfaced with each of the thermoelectric modules, wherein a temperature difference between the high temperature heat source and low temperature heat source produces a thermoelectric power; and
   a controller configured to monitor the thermoelectric power generated by each of the thermoelectric modules, wherein the controller is further configured to optimize a utilization of the thermoelectric power generated by each of the thermoelectric modules.

2. The energy recovery system of claim 1, wherein the controller is further configured to select the at least one thermoelectric module to supply the generated thermoelectric power to an electrical equipment of the vehicle based on a power requirement of the electric equipment of the vehicle.

3. The energy recovery system of claim 2, wherein the electrical equipment of the vehicle includes one of a vehicle drive system and an auxiliary system.

4. The energy recovery system of claim 1, wherein the controller is further configured to optimize a utilization of the thermoelectric power generated by each of the thermoelectric modules based on a power requirement of the vehicle.

5. The energy recovery system of claim 1, wherein the plurality of heat sources further includes a dynamic brake grid and an intercooler.

6. The energy recovery system of claim 1, wherein the low temperature heat source includes ambient air.

7. The energy recovery system of claim 1, wherein the low temperature heat source includes a cooling system.

8. A locomotive comprising:
   a plurality of heat sources generating waste heat, the plurality of heat sources including an engine exhaust and an aftercooler, the aftercooler using a first cooling fluid to extract heat from an intake air;
   at least one thermoelectric module associated with each of the plurality of heat sources, wherein the waste heat provides a high temperature heat source for each of the thermoelectric modules, the at least one thermoelectric module including a first thermoelectric module and a second thermoelectric module, the engine exhaust interfaced with the first thermoelectric module, the first cooling fluid interfaced with the second thermoelectric module after the aftercooler, the first cooling fluid providing a high temperature heat source for the second thermoelectric module;
   a low temperature heat source interfaced with each of the thermoelectric modules, wherein a temperature difference between the high temperature heat source and low temperature heat source produces a thermoelectric power; and
   a controller configured to monitor the thermoelectric power generated by each of the thermoelectric modules, wherein the controller is configured to selectively utilize the thermoelectric power generated by each of the thermoelectric modules to power locomotive electrical equipment.

9. The locomotive of claim 8, wherein the controller is further configured to select the at least one thermoelectric module to supply the generated thermoelectric power to an electrical equipment of the locomotive based on a power requirement of the electric equipment of the locomotive.

10. The locomotive of claim 9, wherein the electrical equipment of the locomotive includes one of a locomotive drive system and an auxiliary system.

11. The locomotive of claim 8, wherein the controller is further configured to optimize a utilization of the thermoelectric power generated by each of the thermoelectric modules based on a power requirement of the locomotive.

12. The locomotive of claim 8, wherein the plurality of heat sources further includes a dynamic brake grid and an intercooler.

13. The locomotive of claim 8, wherein the low temperature heat source includes ambient air.

14. The locomotive of claim 8, wherein the low temperature heat source includes a cooling system.

15. A method of energy recovery in a vehicle having a plurality of heat sources generating waste heat, the plurality of heat sources including an engine exhaust and an aftercooler, the aftercooler using a first cooling fluid to extract heat from an intake air, the method comprising:
   interfacing at least one thermoelectric module with each of the plurality of heat sources, wherein the waste heat provides a high temperature heat source for each of the thermoelectric modules, the at least one thermoelectric module including a first thermoelectric module and a second thermoelectric module, the engine exhaust interfaced with the first thermoelectric module, the first cooling fluid interfaced with the second thermoelectric module after the aftercooler, the first cooling fluid providing a high temperature heat source for the second thermoelectric module;
   interfacing a low temperature heat source with each of the thermoelectric modules, wherein a temperature difference between the high temperature heat source and low temperature heat source produces a thermoelectric power; and monitoring the thermoelectric power generated by each of the thermoelectric modules to optimize a utilization of the thermoelectric power generated by each of the thermoelectric modules.

16. The method of claim 15 further comprises selecting the at least one thermoelectric module to supply the generated thermoelectric power to an electrical equipment of the vehicle based on a power requirement of the electric equipment of the vehicle.

17. The method of claim 16, wherein the electrical equipment of the vehicle includes one of a vehicle drive system and an auxiliary system.

18. The method of claim 15 further comprises optimizing the utilization of the thermoelectric power generated by each of the thermoelectric modules based on a power requirement of the vehicle.

19. The method of claim 15, wherein interfacing the low temperature heat source includes interfacing a cooling system as the low temperature heat source with the at least one thermoelectric module.

20. The method of claim 15, wherein interfacing the low temperature heat source includes interfacing ambient air as the low temperature heat source with the at least one thermoelectric module.

* * * * *